J. C. KNISS.
PREPARATION OF FOODS FOR THE MARKET.
APPLICATION FILED JULY 22, 1910.
1,008,920.  Patented Nov. 14, 1911.
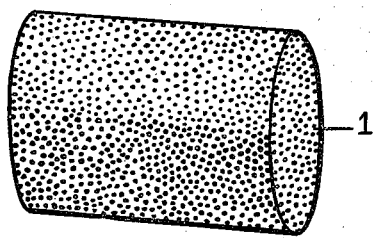
Fig-1-
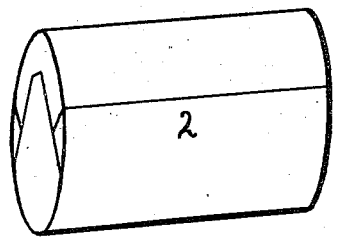
Fig-2-
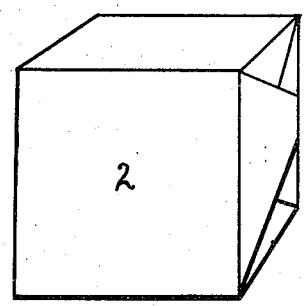
Fig-3-
WITNESSES:
Maria K. Beynroth.
Annie B. Knobel
INVENTOR.
John Christian Kniss.
BY Abraham Knobel,
ATTORNEY.

UNITED STATES PATENT OFFICE.

JOHN CHRISTIAN KNISS, OF LOUISVILLE, KENTUCKY.

PREPARATION OF FOODS FOR THE MARKET.

1,008,920.  Specification of Letters Patent.  Patented Nov. 14, 1911.

Application filed July 22, 1910. Serial No. 573,178.

*To all whom it may concern:*

Be it known that I, JOHN CHRISTIAN KNISS, a citizen of the United States, residing at Louisville, in the county of Jefferson and State of Kentucky, have invented a new and useful Improvement in the Preparation of Foods for the Market, of which the following is a specification.

This invention relates to food preparations, and particularly putting up such preparations in marketable form, and some of the objects of my improvement are to prepare composite food preparations, such as soups, in a comminuted and dry state, ready for cooking; to form measured portions of the preparation into friable cakes and place the cakes in moisture proof wrappers which will at the same time be impenetrable to and prevent the escape of the aroma of the condiment ingredients; lightness of the product, so as to render it mailable and save transportation charges; to enable those inexperienced in cooking such foods to prepare delicious viands with minimum care and labor; to prepare such foods so that they will keep in any climate; convenience in distribution; and comparative inexpensiveness of wrapping.

The preferable form of the package in which the product is put up is illustrated in the accompanying drawings, in which—

Figure 1 is a perspective view of a cake without the wrapper; Fig. 2, a perspective view of the same wrapped; and, Fig. 3 is a perspective view of a cubical package.

Similar reference numbers refer to similar parts throughout the several views of the drawing.

It is customary to put up and distribute soups in tin cans. The soups thus put up contain considerable water and are cooked at the place of manufacture. The cans, and especially the water, are heavy and entail considerable cost for transportation and labor in handling. Tin cans, also, are more costly than paper wrappers; and water is everywhere obtainable. Furthermore, the lead in the solder with which the cans are made and closed in present practice is sometimes attacked by the acids of liquid soup and poisoning results.

In the present improvement, food ingredients, such as beans, rice, vegetables and so forth are comminuted and dried. Salt and other flavoring ingredients and condiments are also comminuted and added in a dry state and commingled with the food ingredients. The mixture is then formed into a cake, 1, of any convenient shape. The forming is preferably accomplished by filling the mixture into a suitable metallic mold and pressing it with a plunger. The pressure is continued for about two or three minutes, in order to allow the particles of the mixture to cohere. No moisture, however, is permitted in the mixture, because this would evaporate subsequently and cause the cake to become hard. The cake must be friable, in order that it may be easily and quickly disintegrated preparatory to cooking. The cake thus formed is preferably in the shape shown in Figs. 1 and 2, but may be of cubical form, as shown in Fig. 3, or in any other desirable shape which is convenient for packing and shipping, and is inclosed in a wrapper, 2, of waxed paper or other suitable material which is moisture proof and impervious to the aroma of the condiment or spice ingredients of the preparation.

In practice when this food product is to be used for making soup, the cake as it is received by the consumer is unwrapped, placed in a suitable dish and crushed. This may be easily done with the fingers or with a spoon, since the cake is thoroughly friable. Sufficient cold water is then added and stirred in to form a thin batter. The batter is then slowly poured into a vessel of boiling water, the water being constantly stirred while the batter is added. This is then allowed to boil for about twenty minutes, when the soup will be completed.

It will be understood that with this product it is not necessary for the consumer to be an experienced cook to produce excellent dishes, but any one without previous experience may do so. It will also be appreciated that since the ingredients are prepared and comminuted they are thoroughly cooked within the short time specified and may be easily digested and the preparation may be eaten by invalids and convalescents. Furthermore, the ingredients may be put up at a comparatively low price and therefore are within the reach of those in moderate circumstances, and save time usually required for preparing vegetables and other ingredients preparatory to cooking. The product being put up in a dry state is easily kept in any climate and hence is capable of wide distribution and use.

Having thus described my invention, so that any one skilled in the art pertaining thereto may carry out the process, and any one of ordinary intelligence will be able to successfully use the product, I claim—

5. The method of preparing foods, consisting first of comminuting several dry ingredients including dry flavoring ingredients, then mixing said ingredients together, and finally compressing the dry mixture into friable cakes.

JOHN CHRISTIAN KNISS.

Witnesses:
ABRAHAM KNOBEL,
MARIA K. BEYNROTH.